(12) United States Patent
Hung

(10) Patent No.: US 6,764,088 B2
(45) Date of Patent: Jul. 20, 2004

(54) PEDALLING MACHINES INCLUDING SCOOTERS AND DRIVING MECHANISMS THEREFOR

(76) Inventor: George Hon-Cheung Hung, Merry Terrace, Block K, 1st Fl., 4 Seymour Road, Hong Kong (HK)

(*) Notice: Subject to any disclaimer, the term of this patent is extended or adjusted under 35 U.S.C. 154(b) by 0 days.

(21) Appl. No.: 10/259,387

(22) Filed: Sep. 30, 2002

(65) Prior Publication Data

US 2003/0193158 A1 Oct. 16, 2003

(30) Foreign Application Priority Data

Apr. 11, 2002 (HK) ........................................ 02102751.3

(51) Int. Cl.7 ............................................... B62M 1/02
(52) U.S. Cl. ..................................... 280/221; 280/259
(58) Field of Search ................................ 280/221, 256, 280/257, 294, 253, 258, 252, 255, 236, 237, 259

(56) References Cited

U.S. PATENT DOCUMENTS

| 310,676 | A | * | 1/1885 | Hall ........................... 280/221 |
| 594,980 | A | * | 12/1897 | Booth et al. ................. 280/253 |
| 776,661 | A | * | 12/1904 | Greenison ....................... 74/48 |
| 3,857,585 | A | * | 12/1974 | Foster .......................... 280/294 |
| 4,582,342 | A | * | 4/1986 | Lew et al. .................... 280/221 |
| 5,207,442 | A | * | 5/1993 | Gray et al. ................... 280/256 |
| 5,871,221 | A | * | 2/1999 | Min et al. .................... 280/253 |
| 6,270,102 | B1 | * | 8/2001 | Fan ............................. 280/252 |
| 6,439,590 | B1 | * | 8/2002 | Liang .......................... 280/221 |
| 2002/0093171 | A1 | | 7/2002 | Chen |

FOREIGN PATENT DOCUMENTS

JP          4-87893      * 3/1992

* cited by examiner

*Primary Examiner*—Anne Marie Boehler
(74) *Attorney, Agent, or Firm*—Burns, Doane, Swecker & Mathis, L.L.P.

(57) ABSTRACT

This invention relates to a drive mechanism for a scooter or similar vehicle. A pair of opposed rotatable crank arms are mounted to a drive gear on the frame. Each crank arm is attached to a footboard that is itself rotatably mounted to the frame. The footboard is mounted further from the axis of the crank arms than the distance from the axis of the crank arms to the point at which they contact the footboards. Reciprocating downward pressure on each footboard drives rotation of the crank arms which in turn drive a wheel of the vehicle.

4 Claims, 10 Drawing Sheets

PEDALLING MACHINES INCLUDING SCOOTERS AND DRIVING MECHANISMS THEREFOR

FIELD OF THE INVENTION

The present invention relates to pedalling machines, such as scooters, stepping exercise machines and other wheeled machines such as bicycles, tricycles and the like.

This invention also relates to drive arrangements or mechanisms for, in particular, although not necessarily solely, pedalling machines or vehicles similar in form to conventional scooters. The invention may, in some aspects, also apply to bicycles or other similar land-based pedal craft.

BACKGROUND TO THE INVENTION

Pedalling machines such as stepper or stepping exercise machines are found in many fitness centres. It is desirable that such stepping exercise machines can be configured to combine in synergy the effects of stepping machines and spinning machines which are generally similar to exercise bicycles.

Vehicles such as scooters have existed for a considerable period of time. Throughout that period, the general form of the scooter varied little from the standard construction of a two-wheeled vehicle, a footboard on which a user may stand intermediate of the front and rear wheels and an upright post with handles for steering attached directly to and over the front wheel.

The varied named scooter may well be derived from its conventional driving system of a user standing with one foot on the scooter and the other being used to push the vehicle along its path. To some extent, a drive mechanism for a scooter is inconsistent with the term for the vehicle itself, however, it is to be appreciated that the term "scooter" generally applies to vehicles of that basic overall construction.

In providing drive mechanisms for scooters, conventional techniques such as motorized power have been applied. However, considerable difficulty has been experienced in generating any form of pedal-based system for use in scooters.

For example, scooters usually have a low clearance to ground and conventional rotationally based-pedal and craned-mechanisms need to rely on a relatively short-craned length from the centre of drive rotation to the pedal. Trying to generate sufficient power from a cyclic motion in which the radius of the path of the pedal is small is quite difficult. It is substantially more difficult when provided on an item having no conventional seat on which a user may reside.

Indeed, to a large extent, cyclic motion of pedals is difficult without a seat and although this may be performed for a short period on bicycles where the craned length is substantially greater, even on bicycles it is difficult to maintain this for long periods of time.

For these reasons, an alternative manual drive mechanism may be desirable.

OBJECT OF THE INVENTION

It is an object of this invention to provide drive arrangement for pedalling machines such as stepping machines and vehicles such as scooters that may overcome some of the disadvantages of the prior art or at least provide users with a useful choice.

SUMMARY OF THE INVENTION

Accordingly, in a first aspect, the invention may broadly be said to consist in a drive mechanism for a vehicle having at least one front and one rear wheel comprising:

a pair of co-axle opposed rotatable crank arms to directly or indirectly drive a wheel of said vehicle;

a pair of rotatably mounted footboards mounted on said vehicle and wherein said footboards are engaged at or adjacent an outer end of said crank arms such that downward pressure on one footboard may cause downward rotation of the connected crank arm; and wherein the distance between the axis of rotation of the footboards and the axis of rotation of the crank arms is substantially greater than the distance from the centre of rotation of the crank arms to the point of connection with said footboards.

Preferably a drive gear is co-axially mounted with said crank arms to be rotated by rotation of said crank arms.

Preferably said drive gear is connected with an axle of a driven wheel to drive rotation of the wheel of the vehicle.

Preferably said connection to said drive wheel comprises a chain connecting said drive gear with a gear co-axially mounted to said driven wheel.

Preferably said interconnection between said crank arms and said footboards allow movement of the point of connection in the radial direction of extension of the footboards while being substantially fixed in a transverse direction.

In a second aspect of the present invention, there is provided a pedalling machine including:

a main housing, a pair of co-axially rotable crank members, each of said crank members including a first arm portion extending generally radially from the axis of rotation of said crank members ("said Axis of Rotation") and a second arm portion extending substantially parallel to said Axis of Rotation from the distal end of said first arm portion, wherein said first arm portions of said crank members being disposed oppositely and diametrically about said Axis of Rotation, and a pair of pivotally movable footboards both extending from the same side of said Axis of Rotation towards said crank members, each distal end of said footboard being in driving engagement relationship with said second arm portion of the corresponding crank member so that each downward pivotal angular movement of said footboard will bring about movement of said correspond crank member in the same angular direction.

Preferably, the length of each said footboard is longer than the distance between the pivotal axis of said footboard and said Axis of Rotation.

Preferably, said machine further including a drive wheel which is co-axially rotatable with and mounted between said pair of crank members for driving engagement by said crank members.

Preferably, said footboard includes a downwardly dependent member which supports the machine in a tilted upright posture when the second arm portion of the corresponding crank member is at its lowest point in its rotation about said Axis of Rotation.

Preferably, the divergent angle between said pair of footboards is about 36°.

According to another aspect of the present invention, there is provided a vehicle including:

A pair of wheels interconnected by a frame.

A drive wheel located intermediate between the axles of said pair of wheels, said drive wheel includes a pair of crank members radially extending from said axle of said drive wheel, each said crank member includes a connecting arm at its distal end which is substantially parallel to said axle of said drive wheel, said pair of crank members being separated by the plane of rotation of said drive wheel.

A transmission link connecting said drive wheel to drive at least one of said pair of wheels.

A pair of footboards separated by the plane of rotation of said drive wheel, each said footboard being pivotable about an axle substantially parallel to the axle of said drive wheel, said connecting arm of said crank member being slidable along at least a portion of the footboard on the same side of said drive wheel, said footboard and said connecting arm being disposed so that downward pivotal movements of said footboard cause sliding and rotation of said connecting arm in a direction to drive said vehicle.

Preferably, one of said pair of wheels is pivotally movable about an axle which is substantially orthogonal to the axle of said wheel for steering.

Preferably, said pairs of footboards and said pair of connecting arms are in alternate driving engagement relationship so that when a connecting arm on one side of said drive wheel is being downwardly driven by a footboard, the footboard on the other side of said drive wheel will be upwardly driven to prepare for the next driving engagement.

Preferably, said transmission link connecting said drive wheel to said at least one of said pairs of wheels includes a mechanism to convert a counter-clockwise rotation of the drive wheel into clockwise rotation of said wheel.

Other aspects of the invention will become apparent to those skilled in the art to which the invention relates upon reading the following description and the preferred embodiments disclosed therein.

BRIEF DESCRIPTION OF THE DRAWINGS

Preferred embodiments of the invention will now be described with reference to the following drawings in which.

DETAILED DESCRIPTION OF PREFERRED EMBODIMENTS

Figure 1:
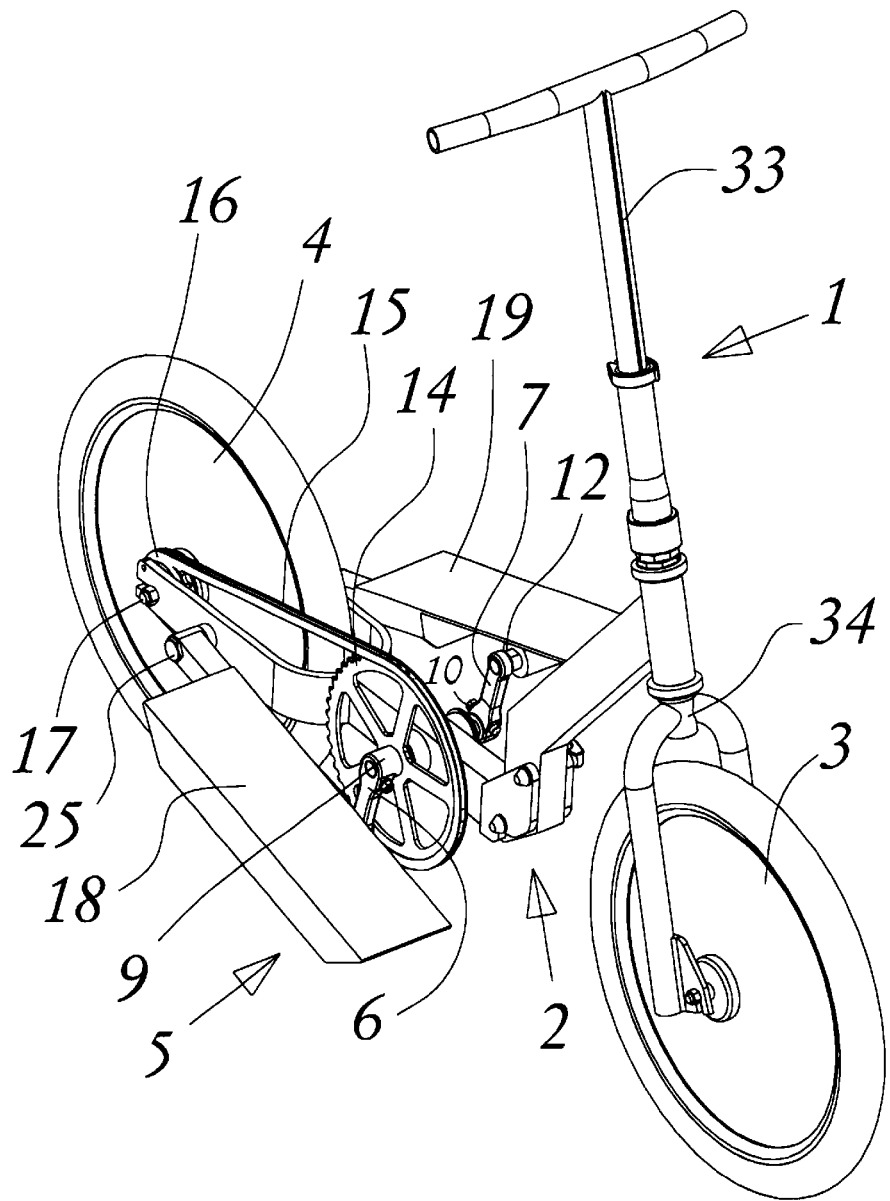
FIG. 1 shows a perspective view of a scooter in accordance with one embodiment of the invention.

Referring to the drawings, various embodiments of the invention are described. Throughout the description, reference is made to scooters and bicycles with the majority of the description being given in relation to scooters specifically. It will be appreciated on reading the various embodiments that many aspects described may equally apply to stepping machines and other machines or vehicles and although those described are usually provided as two wheeled vehicles, other wheel or non-wheel arrangements may also apply. For example, the basic scooter can easily be provided with a tandem rear wheel or by connecting the drive wheel to a resistance load without making any departure from the aspects of the invention itself.

The term scooter is generally used in the specification to describe a usually two wheeled vehicle having a body portion on which a user may stand and an upstanding steering column yet no seat or seat post.

Figure 2:
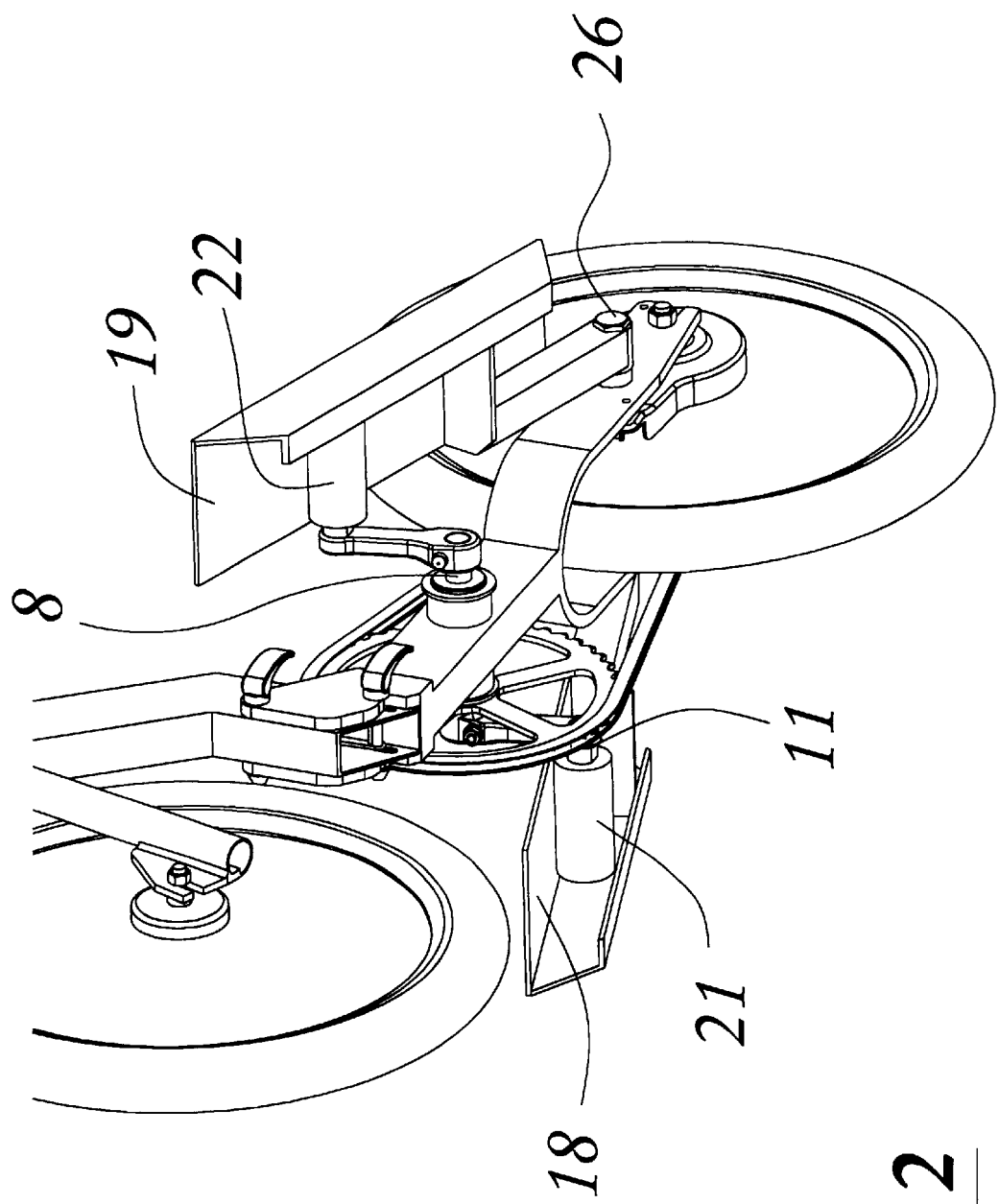
FIG. 2 shows a perspective underside view of a portion of the embodiment of FIG. 1.

Referring to FIGS. 1 and 2, one embodiment of the invention is shown in the form of a scooter 1 having a main housing or central frame 2, which in this embodiment, acts to support connections for rotatable front 3 and rear 4 driven wheels.

Unlike convention scooters that rely solely on pushing of the vehicle by the user, this scooter also incorporates a drive mechanism 5.

This particular drive mechanism is constructed to drive the rear driven wheel 4. It will be apparent that the various embodiments described may be reversed where possible to drive the front driven wheel instead. However, due to the front wheel 3 being used for steering in most such scooters, it is preferred to drive the rear driven wheel as this may simplify the mechanism 5.

The drive mechanism 5 of this embodiment includes a pair of crank members 6 and 7, rotatably mounted to the frame 2. Each crank member includes a first crank arm portion and a second crank arm portion. The first arm portion extends radially from the axle 8 and the second arm portion 11, 12 extends generally transversal to the first arm portion and parallel to the axle 8 at the distal end of the first arm portion. Here, the distal end refers to the end of the first arm portion away from the axle 8. Typically the crank members 6 and 7 will be co-axially mounted to further simplify the mechanism 5. Each crank member 6, 7 is mounted to rotate about an axis of rotation about the axle 8 through or connected to the frame 2 at an inner end 9, 10 while an outer end or the second crank arm 11, 12 transcribes a circle about the axle 8.

The crank members 6, 7 are themselves connected to a driving gear wheel 14 which in turn is operatively connected to a driven wheel, being in this case, the rear wheel 4. This is in accordance with a conventional bicycle arrangement for translating rotational motion of crank arms into drive of a wheel. The operative connection in a case such as this may use a chain 15 or an endless belt and an optional driven gear 16 fixed rotationally with the driven wheel to cause some form of corresponding rotation. Typically this would involve mounting the gear 16 co-axially with the driven wheel 4 on its axle 17. Other bicycle technology or similar has included variations on these methods such as replacing the chain with a rotating drive shaft, etc. These alternatives exist to suit particular applications and can be adopted as necessary into the current mechanism 5.

The scooter 1 uses two footboards 18, 19 to drive rotation of the crank members 6 and 7 respectively. Through the remainder of the mechanism, this in turn rotates the rear driven wheel 4.

The footboards 18, 19 are rotatably mounted to the frame 2 at or adjacent one end of the board and connected to the crank members. The pivotal joints of the footboards in this embodiment are intermediate between the axles of the rear driven wheel 4 and the driving gear wheel 14, although the pivotal joints may be located further away from the gear wheel 14. Each footboard 18, 19 can apply downward pressure to a respective crank member 6, 7. To accommodate rotation of the crank arms, lateral movement of the point of connection along the footboard is necessary.

Referring to FIG. 2, the connection between each footboard and associated crank arm can be seen. In this particular embodiment, rollers 21, 22 on the end of the crank arms contact an underside of each of the footboards. As each footboard is depressed as will be explained later, the associated crank arm may rotate downwards with the footboard and the roller connection allows movement in the radial direction of the footboard from its axis.

Although not critical, it is also preferred to place some form of retention means under the rollers to avoid complete disassociation of the footboards form the rollers. In this embodiment a channel section is provided to trap the rollers with lower flanges 23, 24 keeping the rollers in contact.

Generally, numerous alternative forms of sliding connection between the footboard and the crank arm could be provided however, it should be noted that reduction of friction in the connection is preferred to reduce drag in the drive mechanism as a whole.

As shown in FIG. 2, as the footboard 19 is depressed, the roller 22 will move along the footboard 19, initially towards its outer end, as the crank member 7 is rotated. By fixing the other crank member 6 to the rotation of crank member 7, the crank member 6 is driven up by this process and from the position shown in FIG. 2, will initially move up and inwards along the footboard 18, hence lifting the footboard 18 for the next depression of that board.

It can be seen that, in use, a rider may alternately depress the footboards in a manner not unlike those provided in stepper machines in gymnasiums. Alternate weigh transfers between each of the boards continues the rotation.

Referring again to FIG. 1, it can be seen that connecting axles 25, 26 provide the axis of rotation of the footboards 18, 19 with respect to the frame 2. Although it is not essential that these axles are substantially co-axial connections, it is preferred.

It should be noted that the axis of rotation of the footboards is placed substantially further away from the centre of rotation of the cranks than the radial length of those crank members. In doing so, the angle that the footboards must rotate is reduced to improve the riders stability on the scooter.

Figure 3:
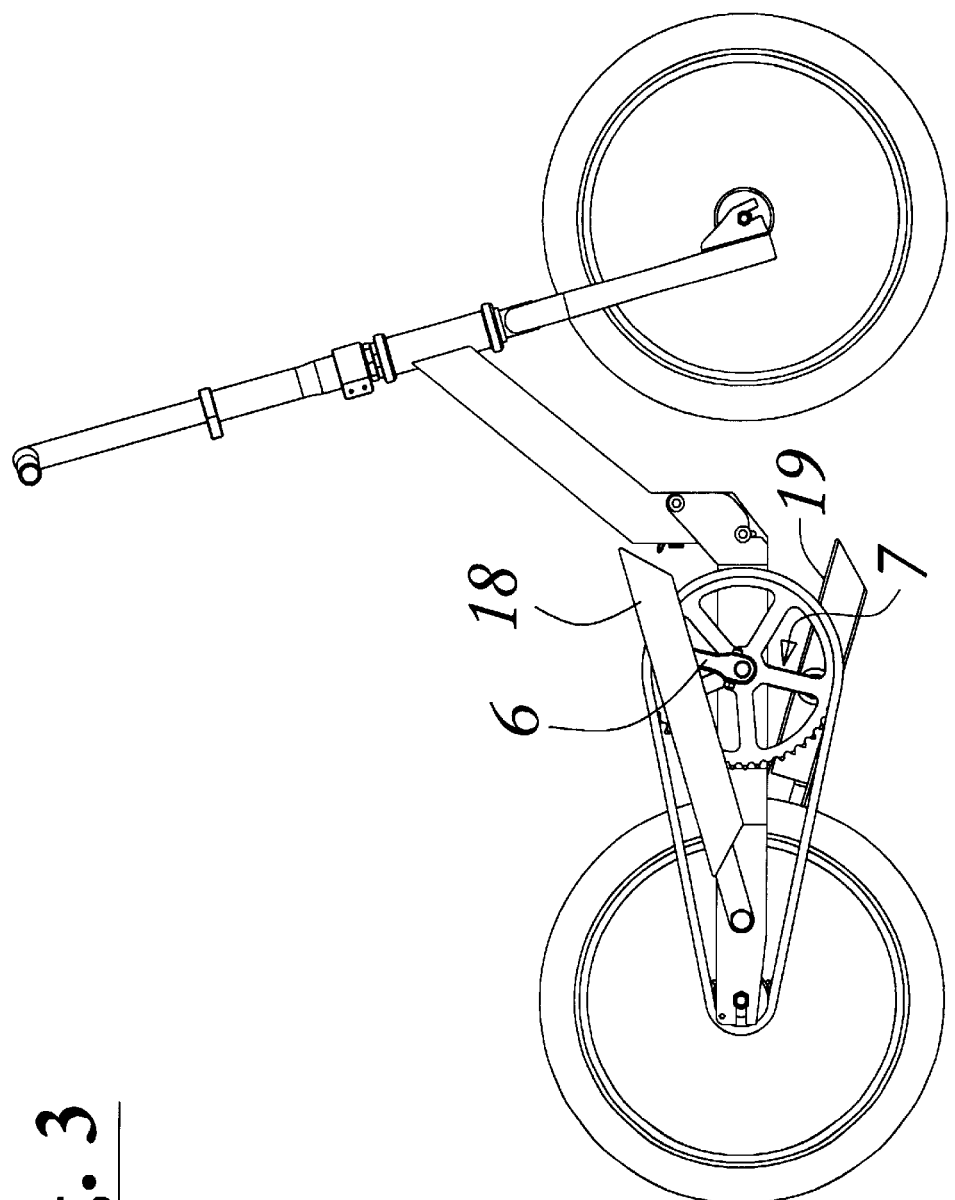
FIG. 3 shows a side view of embodiment of FIG. 1 with the left footboard at bottom dead center and the right footboard having passed the top dead center.
Figure 4:
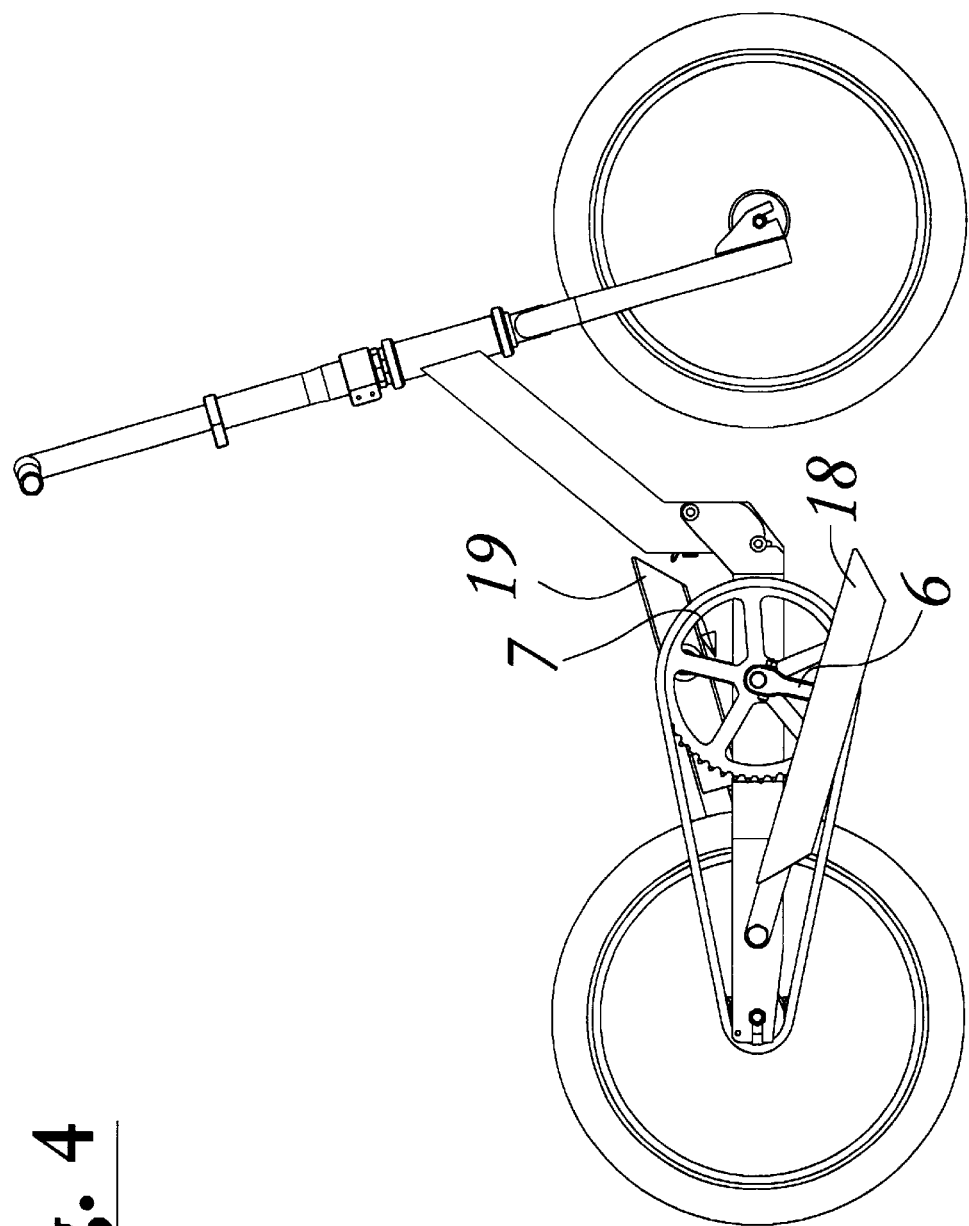
FIG. 4 shows a side view of embodiment of FIG. 1 with the right footboard at bottom dead center and the left footboard having passed the top dead center.

Referring to both FIGS. 3 and 4, it can be seen that the left and right cranks are respectively at their bottom dead centre positions with respect to the corresponding footboards.

At this moment, the upper crank member has passed the top dead centre position relative to the footboard and, as will be appreciated, drive will continue to be imparted to rotate the instantaneous upper crank member clockwisely and advance it towards the bottom dead centre. Thus, the instantaneous upper crank member will continue to receive drive until the first crank arm portion is transverse to the angle of the footboard. As shown in FIG. 3, the left footboard 19 has reached its bottom dead centre position with the footboard 19 and the first arm portion of the crank member 7 at right angles to each other. In this position, it can clearly be seen that the crank arm 6 has progressed beyond its own highest vertical upwards position (which has already passed its top dead centre) and is ready to be rotated downwards while driving the opposed crank member 7 upwards.

FIG. 4 shows the other extreme when the right footboard 18 is at its bottom dead centre at which moment the footboard 18 and the first radial crank arm portion of the crank member 6 at right angles to each other. It will be noted that, at this instance, the footboard 19 has passed the top dead centre and the tangential component of the pedalling force acting by the footboard on the crank member 7 will bring about downward movement of the crank member 7 if sufficient driving force is applied. The phrases "top dead centre" and "bottom dead centre" in the present context mean the configuration at which the first crank arm portion is generally at right angles to the footboard so that there is generally no tangential component of the force acting by the footboard on the first crank arm portion of the corresponding crank arm 7.

Figure 5:
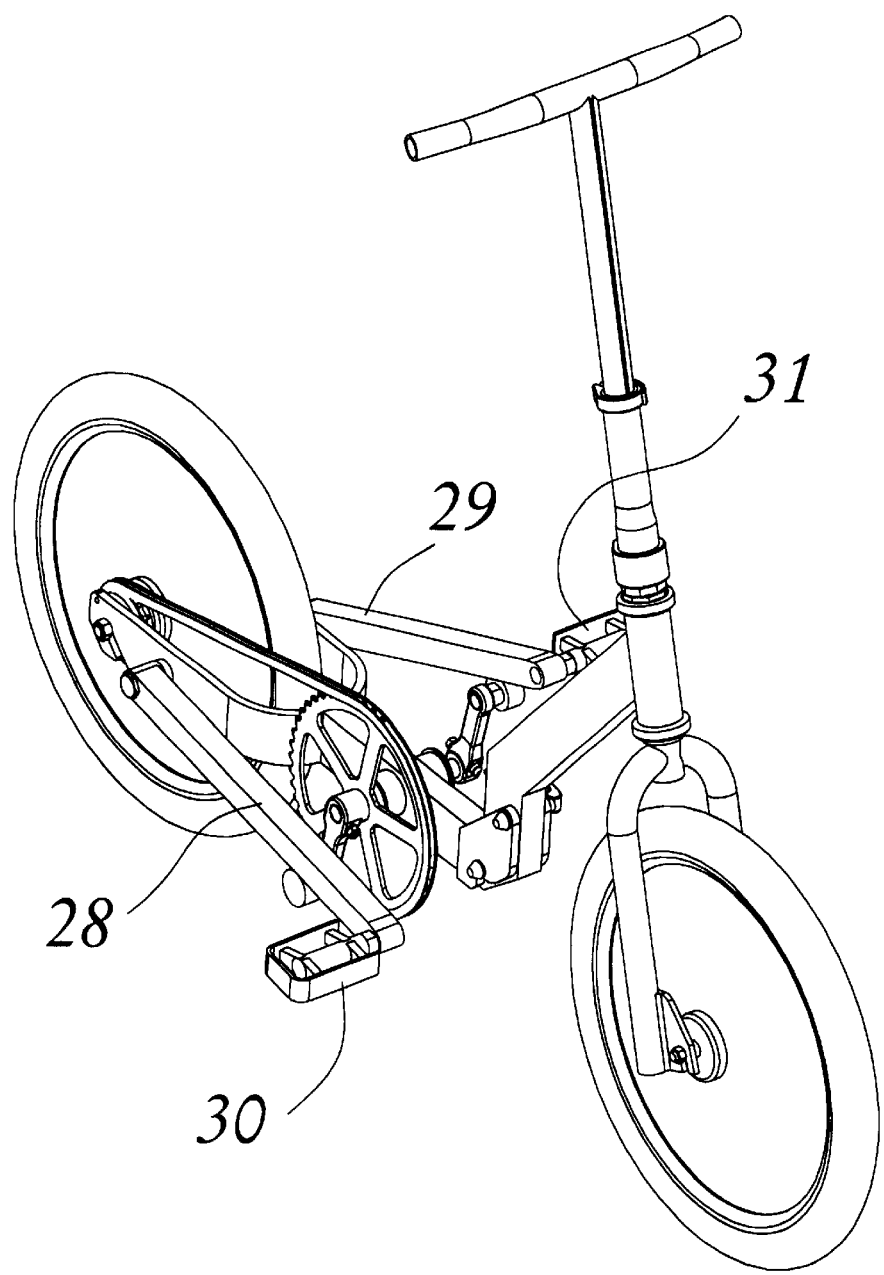
FIG. 5 shows a perspective view of a scooter in accordance with a further embodiment of the invention.
Figure 6:
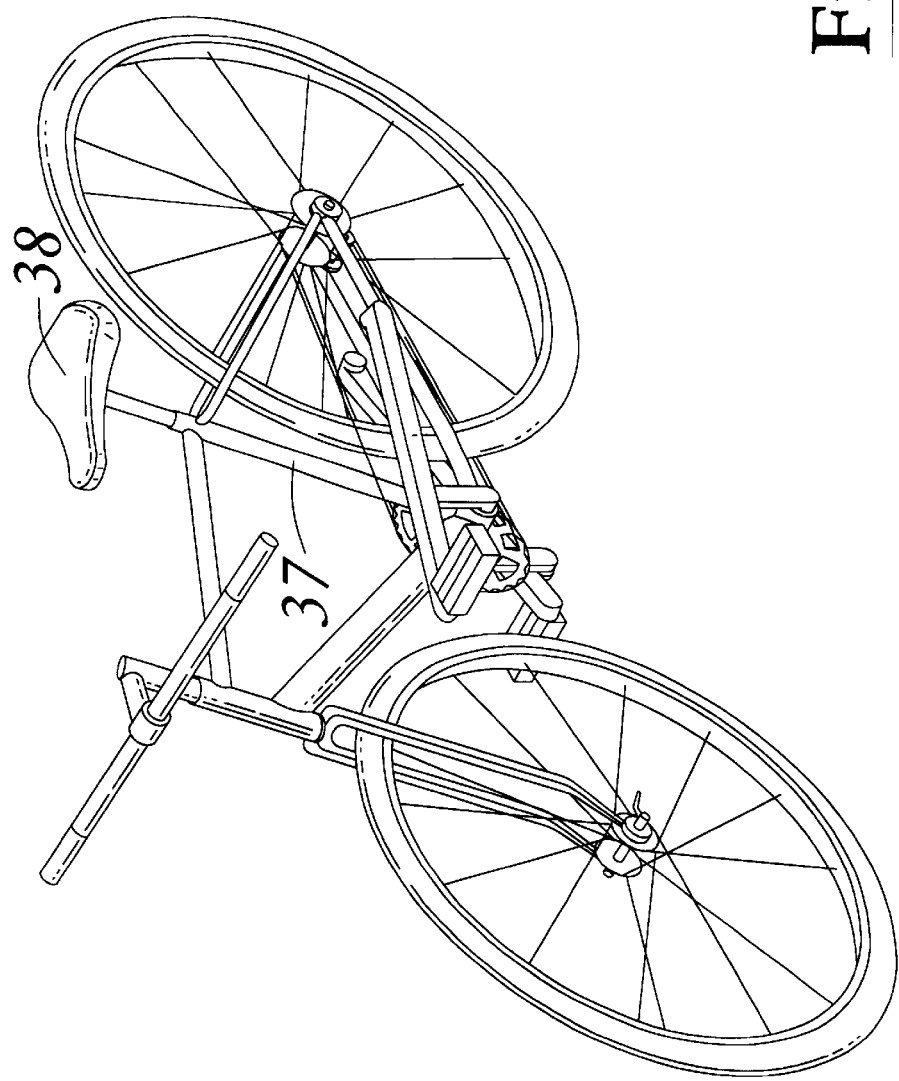
FIG. 6 shows a perspective view of a bicycle in accordance with a yet further embodiment of the invention.
Figure 7:
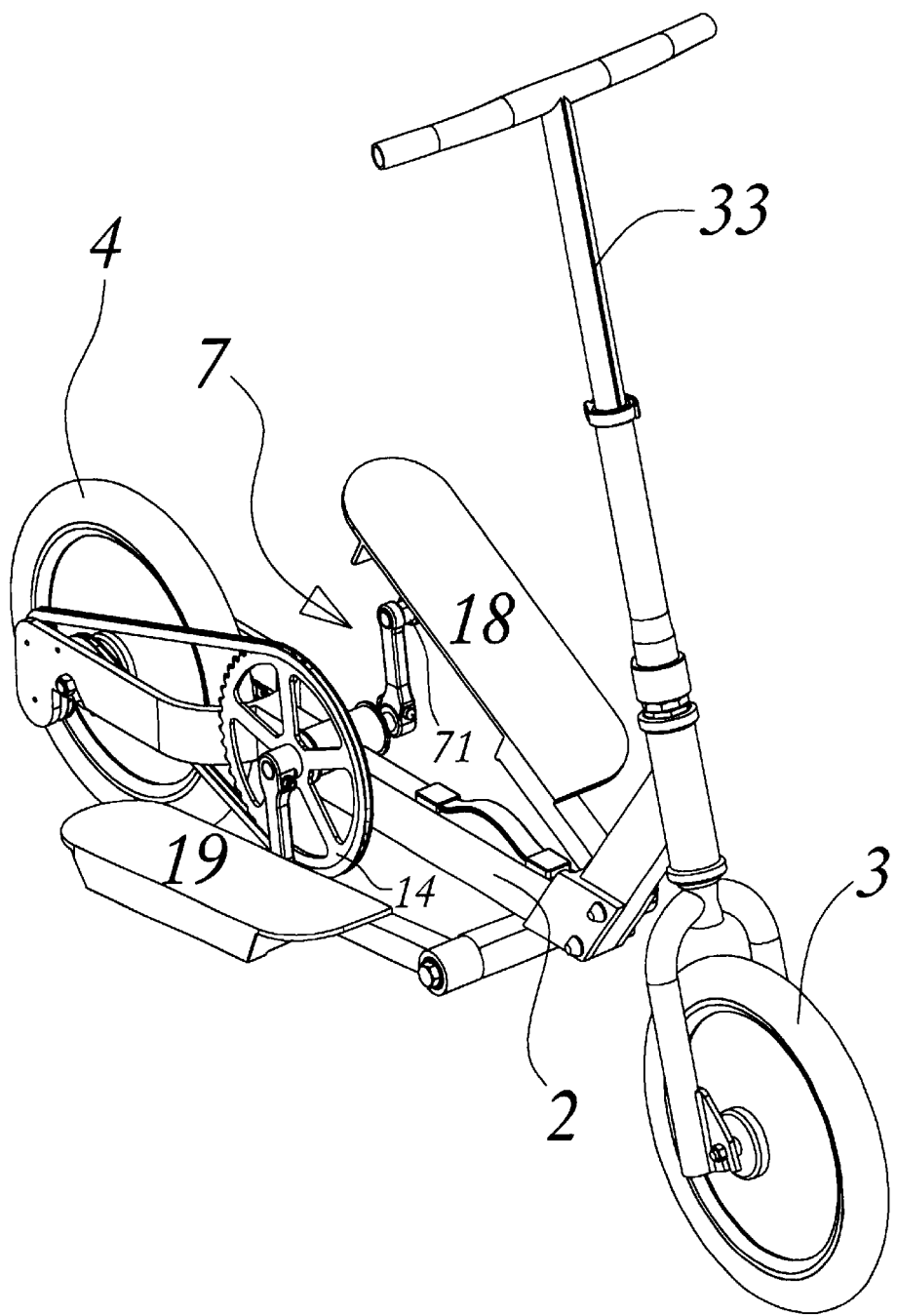
FIG. 7 shows a prospective view of a scooter in accordance with a yet another further embodiment of the invention.
Figure 8:
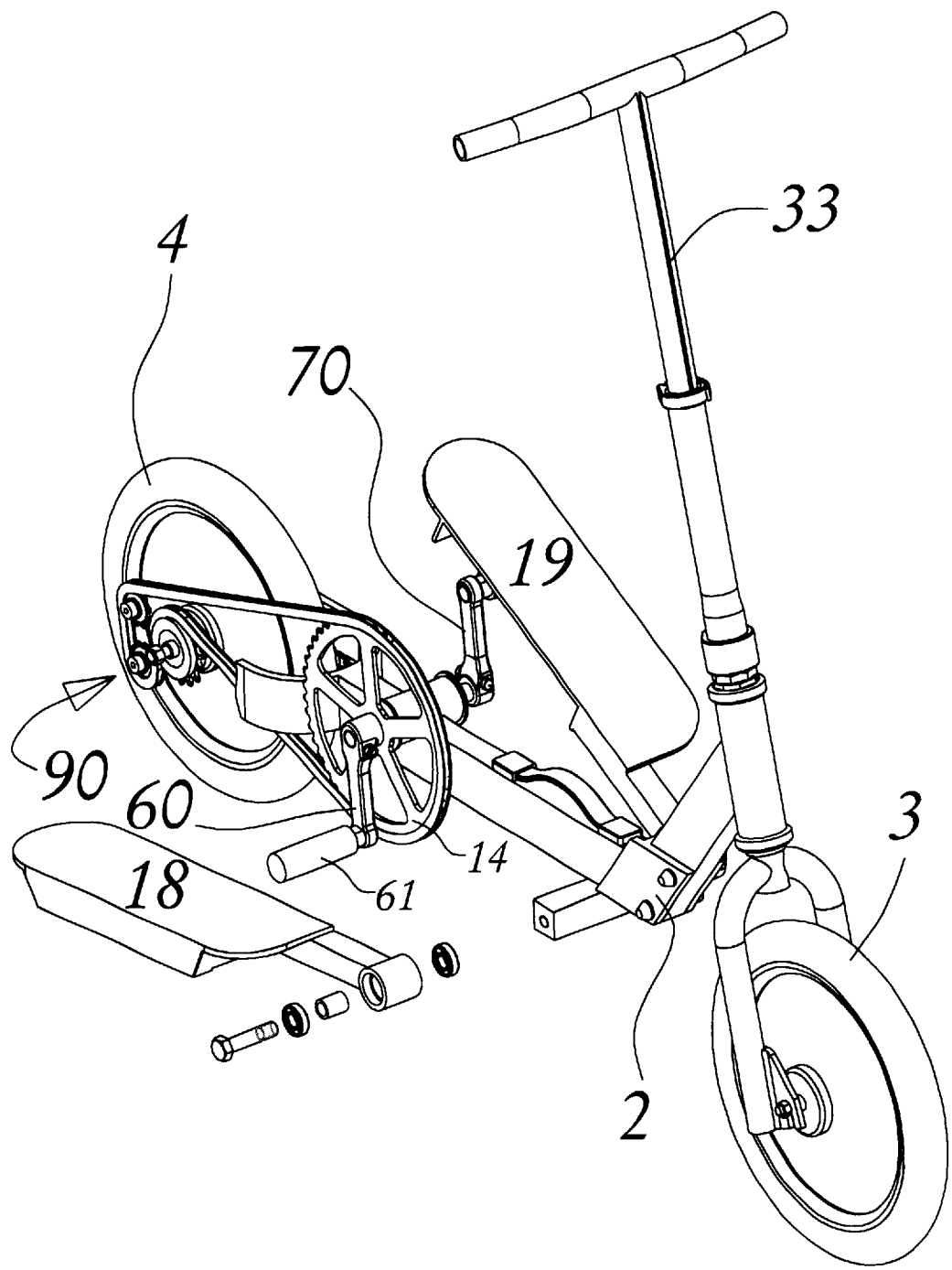
FIG. 8 shows a partly disassembled prospective view of the scooter of FIG. 7.
Figure 9:
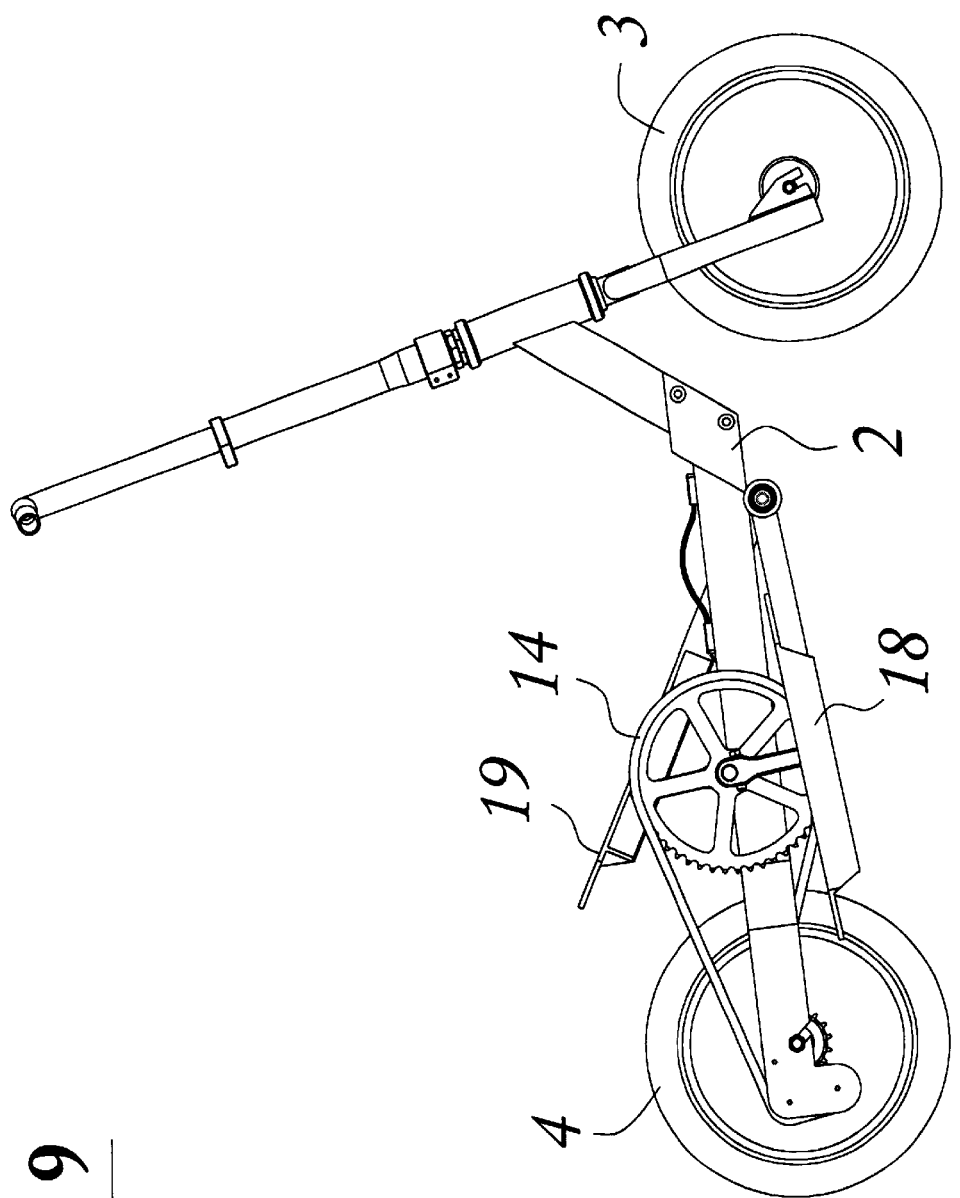
FIG. 9 shows a side view of the scooter of FIG. 7.

Referring generally to FIGS. 5 and 6, an alternative embodiment is shown whereby the footboards 18, 19 have been replaced by extending arms 28, 29 connected to pedals 30, 31. The arrangement is much the same as the previous embodiment and operates in the same manner. It is simply a matter of choice as to which a user or manufacturer may prefer.

The previous embodiments have all used a steering column 33 extended from the front wheel in a generally upright fashion. Typically this is attached to the front wheel by the use of forks, 34. A rotational connection to the frame 2 allows the front wheel to be turned independently to turn the scooter.

In FIG. 6, the same drive mechanism is applied to a bicycle. The only principal difference aside from the usual increase in diameter of the wheels of the vehicle is the inclusion of a seat post 37 and seat 38. Otherwise, the arrangement and operation is the same as described for the scooter.

It will be appreciated that the mechanism may be especially suited to a scooter as the reciprocating motion of the footboards may be easier to use when a particularly short crank arm is provided. To obtain clearance between the ground and the crank, such a short arm is necessary for a vehicle having wheels of smaller diameter than those of a conventional bicycle. Although small children can use conventional bicycles having small wheel diameters, they are uncomfortable for adults to utilise as the rotation movement of the knees is confined over a short range of movement in completion of an entire circle of motion. In contrast, the reciprocating motion of this scooter is easy to use for both adult and children.

In the scooter arrangements, more recent additions to such apparatus such as brakes and foldable frames have been provided. A folding joint is provided in FIG. 1 as shown. Similarly, brakes and the like could be incorporated if desired. However, if the driven wheel such as the rear wheel 4 is provided with no forward freewheeling, such that rotation of the wheel is always associated with rotation of the cranks, braking can be applied by resisting movement of the footboards. This is achieved by placing weight on the rising footboard rather than driving a footboard further down to go forward.

Referring to FIGS. 7 to 10, there is shown a scooter incorporating yet another further embodiment of the present invention of a drive mechanism. The scooter 1 is generally similar to the scooter of FIG. 1 and includes a frame 2 interconnecting a front wheel 3 and a rear wheel 4. A drive or gear wheel 14 is provided on the frame 2 at a location intermediate between the axles of the front 3 and rear 4 wheels.

The drive or driving wheel 14 includes a pair of crank members each having a first crank arm 60, 70 radially extending from the axle 8 of the drive wheel 14. A second crank arm or a connecting arm 61, 71 which is substantially parallel to the axle 8 of the drive wheel, is provided at the distal end of each of the crank members 6 and 7 (or, in other words, the distal end of each of the first crank arms 60, 70) and extends away from the drive wheel. The drive or gear wheel 14 is connected to the rear wheel 4 via a transmission link which is an endless slotted chain in the present specific example. Of course, a driving belt may also be utilized with appropriate modifications.

Similar to the scooter of FIG. 1, a pair of footboards 18, 19 are pivotally mounted on the frame and are disposed on the two sides of the frame 2 or drive wheel 14. Unlike the embodiment of FIG. 1 in which the pivotal axles of the footboard are located intermediate between the drive wheel 14 and the rear wheel 4, the pivotal axles of the footboards 18, 19 of the present embodiment are mounted intermediate between the drive wheel 14 and the front wheel 3.

Each of the footboard 18, 19 includes a plank surface on the underside on which the connecting arm or the second crank arm portion 61, 71 of a crank member can slide while the crank member is undergoing rotational motions. The footboard, particularly the plank surface, is arranged in a driving engagement with the connecting arm of the crank member so that when the connecting arm is elevated above the axle 8 of the drive wheel, downward movements of the footboard will cause the connection arm to slide with respect to the plank surface and to rotate in a direction to drive the rear or driven wheel. At the same time, it would be noted that the pairs of footboard and crank member are in alternate driving engagement relationship. For example, when one footboard is driving the corresponding crank member downwards, the other footboard is being pivotally moved upwards by the other corresponding crank member to prepare for the next downward driving of the crank member in contact with it.

Figure 10:
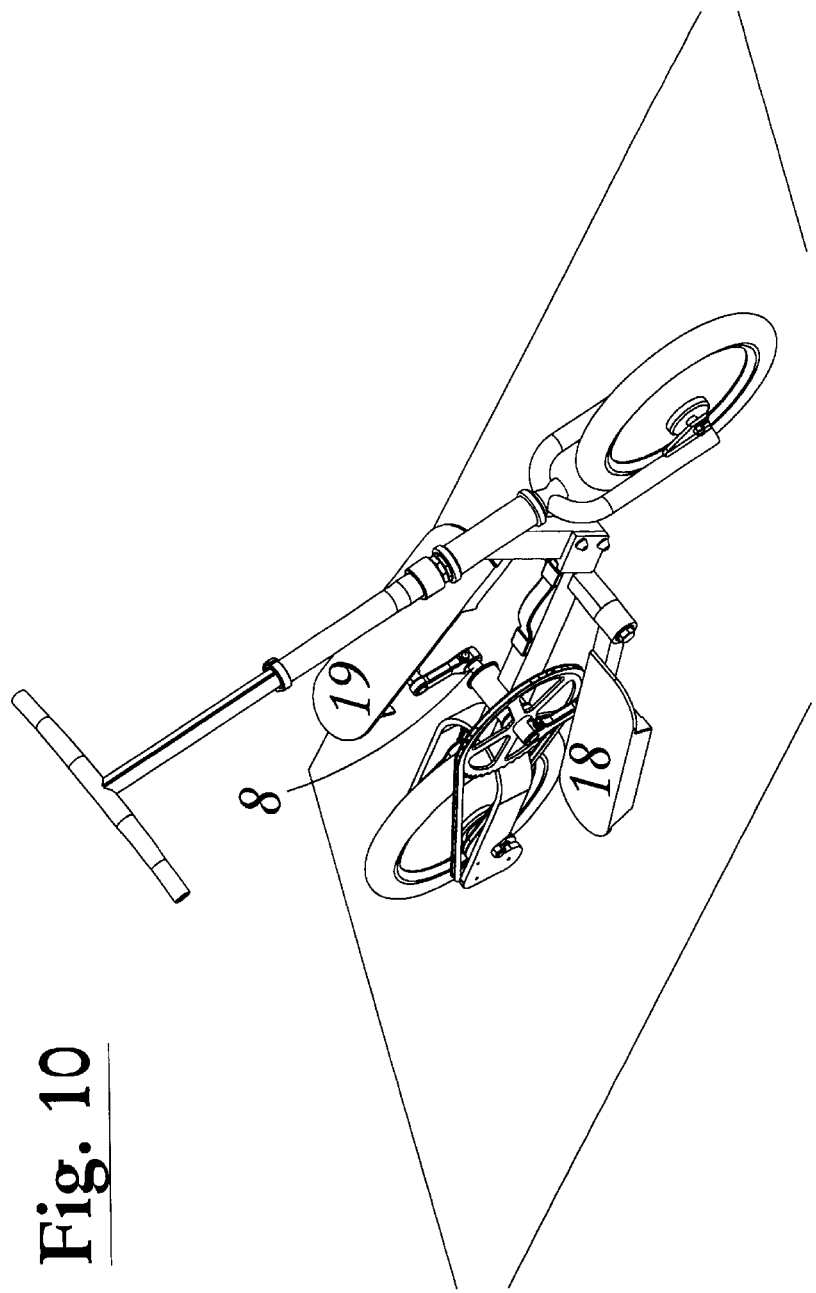
FIG. 10 shows a perspective view of the scooter of FIG. 7 while being supported on a single footboard.

The footboard 18, 19 further includes a downwardly dependent member which provides a screen to keep the end of the connecting arm (or the second arm portion) away from the outside to prevent external matters, such as ends of trousers, from being caught. This downward dependent member also supports the scooter in the tilted upright position as shown in FIG. 10.

In the present embodiment, it will be seen that when the footboard drives the crank member downwardly, the drive wheel will be driven anti-clockwisely. To ensure that this counter-clockwise rotation is translated into a clockwise rotation of the rear wheel in order to forwardly drive the scooter, a simple wheel-drive mechanism 90 is incorporated on the rear wheel so that the slotted chain will pass the upper part of the toothed wheel attached to the rear wheel instead of engaging with the lower half of the toothed wheel as in FIG. 3. By this arrangement, counter-clockwise rotation of the drive wheel will bring about clockwise movement of the rear wheel and therefore provides forward drive to the rear wheel.

To provide an efficient or effective machine drive mechanism while still comfortably accommodating a user's feet, it is highly preferable that the inclination of the footboard with respect to the horizontal plan is about 18°. For the present example, the distance between the crank axle and the footboard pivotal axle is considerably larger than the effective length of the crank members, i.e., the length of the first crank arm portion, for a useful machine ratio. In the present specific example, the distance between the crank and footboard axle is about 270 cm and the effective length of first crank arm portion is about 75 cm.

Thus, it has been described in the various embodiments above drive mechanisms or arrangements which convert substantially rectilinear motions (i.e., vertical movements of the feet of a user) to circular motions of the cranks and the driving wheels. Furthermore, it will be noted with a shorter distance between the axles of the footboard and the crank members, a longer pair of crank arms will result in a greater maximum angular distance between the two footboards. With this arrangement, when one footboard is at the bottom dead center, the other footboard will have well passed its top dead center and downward pressure of that footboards will produce easier or more efficient downward movements of the footboard towards the bottom dead center.

Thus it can be seen that an alternative drive mechanism and a vehicle with such a mechanism is provided that may have advantages over the conventional rotational movement of pedals, especially when applied to scooters. It may also provide an alternative form of exercise to users rather than the conventional bicycle.

The invention has been described with reference to a number of embodiments but should not be considered restricted to those particular embodiments. Specific integers referred to throughout the description are deemed to incorporate known equivalents where appropriate. In particular, while wheeled vehicles in the form of scooters have been described, it will be understood that the drive mechanisms can be easily adapted to other wheeled or non-wheeled machines such as stepping exercisers or other stationery set-ups without loss of generality.

What is claimed is:

1. A pedal-powered vehicle including:

front and rear wheels interconnected by a frame;

a drive wheel located intermediate between axles of said front and rear wheels, said drive wheel including a pair of crank members radially extending from an axle of said drive wheel, each said crank member including a connecting arm at its distal end which is substantially parallel to said axle of said drive wheel, said pair of crank members being separated by the plane of rotation of said drive wheel;

a transmission link connecting said drive wheel to drive said rear wheel via a reversal gear assembly, said reversal gear assembly including a plurality of toothed wheels, at least one of said toothed wheels being a reversal wheel which engages with but is not surrounded by said transmission link so that, during normal operation, the angular rotation of said drive wheel and said reversal wheel are in opposite directions, and a plurality of toothed wheels engaging with and surrounded by said transmission link located downstream of said reversal wheel so that said transmission link will move from said reversal wheel onto said plurality of toothed wheels before returning to said drive wheel;

a pair of footboards separated by the plane of rotation of said drive wheel, each said footboard being pivotable about a footboard axle substantially parallel to the axle of said drive wheel, said footboard axle being intermediate of the axles of said drive wheel and said front wheel, said connecting arm of said crank member being slidable along at least a portion of the footboard on the same side of said drive wheel, said footboard and said connecting arm being disposed so that downward pivotal movements of said footboard cause sliding and rotation of said connecting arm in a direction to drive said vehicle.

2. A vehicle of claim 1, wherein said front wheel is pivotally movable about an axle which is substantially orthogonal to the axle of said wheel for steering, said transmission link including an endless loop, said endless loop being narrowest in the vicinity of the location at which said transmission link engages with said reversal wheel and said plurality of toothed wheels of said reversal gear assembly downstream of said reversal wheel being adapted to enlarge the portion of the loop downstream of said reversal wheel to facilitate return of said transmission link to said drive wheel.

3. A vehicle of claim 2, wherein said pair of footboards and said pair of connecting arms are in alternate driving engagement relationship so that when a connecting arm on one side of said drive wheel is being downwardly driven by a footboard, the footboard on the other side of said drive wheel will be upwardly driven to prepare for the next driving engagement, said plurality of toothed wheels of said reversal gear assembly being disposed to maintain driving engagement between said transmission link and said reversal wheel and to provide a return path for said transmission link.

4. A vehicle of claim 1, wherein said reversal gear assembly includes a mechanism adapted to convert a counter-clockwise rotation of the drive wheel into a clockwise rotation of said rear wheel, said reversal gear assembly including a toothed wheel co-axially attached to said rear wheel for reversing the angular rotation of said drive wheel.

* * * * *